United States Patent Office 3,629,238
Patented Dec. 21, 1971

3,629,238
NOVEL GLUCURONIDES OF 3-INDOLYLALI-
PHATIC ACID DERIVATIVES
Seitetsu Arasaki, Minoo-shi, Atsushi Wakimura, Takara-
zuka-shi, Hisao Yamamoto, Nishinomiya-shi, and
Shigeho Inaba, Takarazuka-shi, Japan, assignors to
Sumitomo Chemical Company, Ltd., Osaka, Japan
No Drawing. Filed Sept. 20, 1968, Ser. No. 761,327
Int. Cl. C07c 69/32
U.S. Cl. 260—234                                        6 Claims

ABSTRACT OF THE DISCLOSURE

Glucuronides of 3-indolylaliphatic acid derivatives represented by the formula,

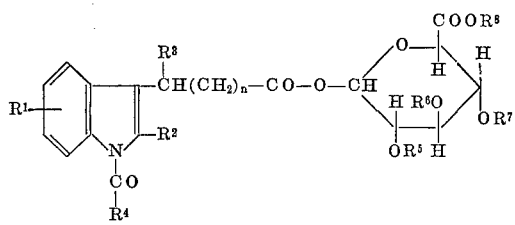

wherein $R^1$ is hydrogen, lower alkyl, lower alkoxy, lower alkylthio or halogen, $R^2$ and $R^3$ are individually hydrogen, phenyl or lower alkyl, $R^4$ is pyridyl or styryl, $R^5$, $R^6$ and $R^7$ are individually hydrogen or acetyl, $R^8$ is hydrogen or lower alkyl, and $n$ is 0, 1 or 2. The novel glucuronides of 3-indolylaliphatic acid derivatives have prominent anti-inflammatory action.

---

This invention relates to novel glucuronides of 3-indolylaliphatic acid derivatives having excellent antiinflammatory effects, a process for producing the same and pharmaceutical compositions containing the same. More particularly, the invention pertains to novel glucuronides of 3-indolylaliphatic acid derivatives represented by the formula,

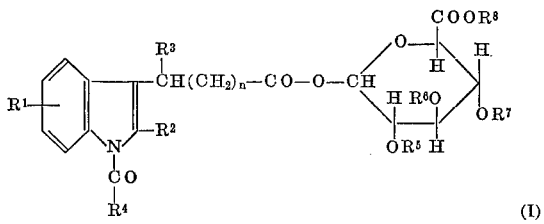

wherein $R^1$ is hydrogen, lower alkyl, lower alkoxy, lower alkylthio or halogen, $R^2$ and $R^3$ are individually hydrogen, phenyl or lower alkyl, $R^4$ is pyridyl or styryl, $R^5$, $R^6$ and $R^7$ are individually hydrogen or acetyl, $R^8$ is hydrogen or lower alkyl, and $n$ is 0, 1 or 2.

Heretofore, the present inventors have found that 3-indolylaliphatic acid derivatives of the formula,

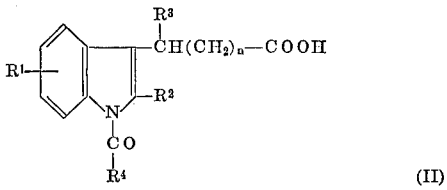

wherein $R^1$, $R^2$, $R^3$, $R^4$ and $n$ have the same meanings as defined above, are excellent in anti-inflammatory effects and filed applications for patent concerning such 3-indolylaliphatic acid derivatives (II), a process for producing the same and pharmaceutical composition containing the same. (U.S. patent application Ser. No. 541,967, and now abandoned and U.S. patent application Ser. No. 635,362.)

Now, according to animal tests carried out by the present inventors, novel glucuronides of 3 indolylaliphatic acid derivatives of the Formula I displayed prominent antiinflammatory effects but low toxicities. For example, 2′,3′,4′-tri-O-acetyl-6′-O-methyl-β-D-glucuronosyl 1-cinnamoyl-2-methyl-5-methoxy-3-indolyl acetate and 2′,3′,4′-tri-O-acetyl-6′-O-methyl-β-D-glucuronosyl 1-nicotinoyl-2-methyl-5-methoxy-3-indolyl acetate are excellent anti-phlogistics which have prominent inhibitory actions on carrageenin edema of the paw of rats, are low in side effects and are markedly low in toxicity.

It is therefore one object of the present invention to provide novel glucuronides of 3-indolylaliphatic acid derivatives having excellent anti-inflammatory effects but low toxicities.

Another object of the present invention is to provide a process for producing such glucuronides of 3-indolylaliphatic acid derivatives.

A further object is to provide a pharmaceutical composition containing as the essential ingredient such glucuronides of 3-indolylaliphatic acid derivatives.

Other objects will be apparent from the following descriptions.

In order to accomplish these objects, the present invention provides glucuronides of 3-indolylaliphatic acid derivatives (I).

Further the present invention provides a process for producing glucuronides of 3-indolylaliphatic acid derivatives (I), which comprises (a) reacting a 3-indolylaliphatic acid derivative represented by the formula,

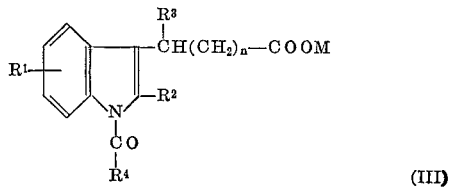

wherein $R^1$, $R^2$, $R^3$, $R^4$ and $n$ are the same as in the case of the Formula I, and M is hydrogen or alkali metal, with a D-glucopyranosyl derivative represented by the formula,

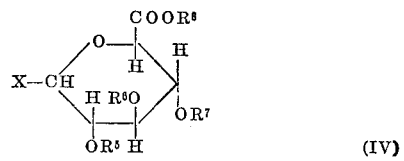

wherein $R^5$, $R^6$ $R^7$, and $R^8$ are the same as in the case of Formula I, and X is halogen or hydroxyl or its reactive ester in a suitable solvent, or (b) administrating a 3-indolylaliphatic acid derivative (III) to a mammal and extracting urine therefrom with an organic solvent under acidic conditions to yield the glucuronide (I).

Furthermore the present invention provides a pharmaceutical composition containing, as the essential ingredient, an effective amount of the glucuronides of 3-indolylaliphatic acid derivatives (I) and a pharmaceutically acceptable carrier.

In the present invention, reaction of a 3-indolylaliphatic acid derivative (III) with a D-glucopyranosyl derivative (IV) is carried out by contacting the 3-indolylaliphatic acid derivative (III) with the D-glucopyranosyl derivative (IV) in a common organic solvent such as methanol, ethanol, acetone, benzene, petroleum benzine, chloroform, tetrahydrofuran, dioxane, dimethylformamide or dimethylsulfoxide. Generally, the reaction is preferably effected in the presence of caustic alkali, alkali carbonate, a silver salt such as silver oxide or silver carbonate, a mercury salt such as mercuric cyanide, or a tertiary amine such as triethylamine, pyridine or dimethylaniline.

In the practice of the process of the present invention, a 3-indolylaliphatic acid derivative (III) and a D-glucopyranosyl derivative (IV) are added into a suitable solvent and the obtained reaction mixture is stirred at room temperature or an elevated temperature, whereby the reaction of the 3-indolylaliphatic acid with the D-glucopyranosyl derivative occurs. In general, it is preferable to heat the reaction mixture. After completion of the reaction, the solvent is removed by distillation or the reaction mixture is poured into water to yield a crude glucuronide of 3-indolylaliphatic acid derivative (I). Purification of the crude product is effected by recrystallization, distillation, chromatography, etc. In the case of the reaction of a free 3-indolylaliphatic acid derivative with a D-glucopyranosyl derivative in which X of the Formula IV is hydroxyl, it is possible to obtain the desired product by carrying out the reaction in the presence of pyridine and a carbodiimide compound such as dicyclohexylcarbodiimide in an inert solvent such as tetrahydrofuran, dichloromethane or acetonitrile. In this case, the reaction may be effected under cooling or heating but generally, at room temperature.

The 3-indolylaliphatic acid derivatives (III) include, for example, compounds having the substituents shown below.

$R^1$=hydrogen, methyl, ethyl, n-propyl, isopropyl, tert-butyl, methoxy, ethoxy, isopropoxy, chlorine, bromine, methylthio or ethylthio.
$R^2$=hydrogen, methyl, ethyl or phenyl.
$R^3$=hydrogen, methyl, ethyl or phenyl.
$COR^4$=cinnamoyl, nicotinoyl or isonicotinoyl.
M=hydrogen, sodium or potassium.

Preferable examples of the D-glucopyanosyl derivative include compounds having the following substituents:

$R^5$, $R^6$ and $R^7$=acetyl or hydrogen.
$R^8$=hydrogen, methyl or ethyl.

Concretely, $2',3',4'$ - tri - O - acetyl - $6'$ - O - methyl-$\beta$-D-glucuronosyl esters and D-glucuronosyl esters of 3-indolylaliphatic acid derivatives shown below can be readily obtained in accordance with the present invention.

$\gamma$-(1-cinnamoyl-2-methyl-5-methoxy-3-indolyl)butyric acid.
1-cinnamoyl-2-methyl-5-chloro-3-indolylacetic acid.
1-cinnamoyl-2-methyl-5-methoxy-3-indolylacetic acid.
1-cinnamoyl-2-phenyl-5-methoxy-3-indolylacetic acid.
$\alpha$-(1-cinnamoyl-2-methyl-5-methoxy-3-indolyl)-$\alpha$-phenylacetic acid.
1-cinnamoyl-2-methyl-3-indolylacetic acid.
$\alpha$-(1-cinnamoyl-2-methyl-5-methoxy-3-indolyl)propionic acid.
1-nicotinoyl-2-methyl-5-methoxy-3-indolylacetic acid.
1-isonicotinoyl-2-methyl-5-methoxy-3-indolylacetic acid.
1-nicotinoyl-3-indolylacetic acid.
1-nicotinoyl-2-methyl-5-chloro-3-indolylacetic acid.
1-nicotinoyl-2,5-dimethyl-3-indolylacetic acid.
1--nicotinoyl-2-phenyl-5-methoxy-3-indolylacetic acid.
1-nicotinoyl-2,4-dimethyl-3-indolylacetic acid.
1-nicotinoyl-2,6-dimethyl-3-indolylacetic acid.
$\alpha$-(1-nicotinoyl-2-methyl-5-methoxy-3-indolyl)-$\alpha$-phenylacetic acid.
$\alpha$-(1-nicotinoyl-2-methyl-5-methoxy-3-indolyl)-propionic acid.
$\gamma$-(1-nicotinoyl-2-methyl-5-methoxy-3-indolyl)butyric acid.

Alternatively, when the 3-indolylaliphatic acid derivatives (III) are administered to mammals such as rabbits, dogs, cats, monkeys, rats or sheep, glucuronides (I) can be obtained as metabolites from the urine of said mammals.

That is, when a 3-indolylaliphatic acid (III) is orally or non-orally administered to a mammal, metabolites thereof appear in the urine after one or several hours. Therefore, the urines excreted during said period, are collected, and the collected urine is acidified to a pH of about 2.0 with an acid, for example 1 N–HCl, and is then extracted with a water-insoluble organic solvent to obtain a desired glucuronide. The thus obtained glucuronides can be purified according to counter current distribution or column chromatography.

In the above manner, individual glucuronides of the 3-indolylaliphatic acid derivatives (I) are obtained.

Further, glucuronic acid and a 3-indolylaliphatic acid derivatives (III) are simultaneously added to liver slices of said mammals, whereby the corresponding glucuronide of the 3-indolylaliphatic acid derivatives (I) can be obtained, as well.

The present glucuronosyl derivatives of 3-indolylaliphatic acids have minimum side effects and no toxic symptom in usual oral doses, while showing potent anti-inflammatory, pyretic and analgesic actions.

The parent compounds of the present compounds, such as 1-cinnamoyl-2-methyl-5-methoxy-3-indolylacetic acid and 1-nicotinoyl-2-methyl-5-methoxy-3-indolylacetic acid show excellent anti-inflammatory actions. However, when these compounds are orally administered to mammals in doses of over 750 mg./kg./day and over 1000 mg./kg./day respectively over a long period, occult bleeding in the feces is found and lesions of the intestines are often observed. Further, in clinical trials, side effects such as anorexia, abdominal inflation or skin-irritation result from oral doses of over 600 mg./human/day of these compounds over a long term. On the contrary, the present compounds, for example, glucuronosyl 1-cinnamoyl-2-methyl-5-methoxy-3-indolylacetate, glucuronosyl 1-nicotinoyl-2-methyl-5-methoxy-3-indolylacetate, $(2',3',4'$-tri-O-acetyl-$6'$-O-methyl - D - glucuronosyl) 1-cinnamoyl-2-methyl-5-methoxy-3-indolylacetate, $(2',3',4'$-tri-O-acetyl-$6'$-O-methyl-D-glucuronosyl) 1-nicotinoyl 2-methyl-5-methoxy-3-indolylacetate have minimum side effects, even when 1000 mg./kg./day of each compound is orally administered to animals for a long term. Further, any toxic symptom such as occult bleeding in the feces, intestinal disturbance, skin irritability or the like is not observed in this test, in spite of the showing of a remarkable anti-inflammatory effect in a carrageenin-induced edema test even when the present compounds are orally administered in a single dose of 100 mg./kg.

The process of the present invention is illustrated in detail below with reference to examples, but the examples are mere illustrative and the invention is by no means limited thereto.

EXAMPLE 1

To a suspension of 14.7 g. of 1-cinnamoyl-2-methyl-5-methoxy-3-indolylacetic acid in 70 ml. of anhydrous methanol was added dropwise over a period of three hours, 32.3 ml. of a 0.434 N potassium tertiary butoxide-tertiary butanol solution while holding the mixture at pH 7–8. After stirring at room temperature for half an hour, the formed solid was collected to give the potassium salt of 1-cinnamoyl-2-methyl-5-methoxy-3-indolylacetic acid in the form of yellow crystals, M.P. 260° (decomp.), $\nu_{max.}^{paraffin}$ 1670 cm.$^{-1}$

*Analysis.*—Calcd. for $C_{21}H_{18}NO_3K$ (percent): C, 65.19; H, 4.68; N, 3.62. Found (percent): C, 65.19; H, 4.57; N, 3.64.

To a suspension of 3.4 g. of said potassium salt in 45 ml. of dimethylsulfoxide was added methyl 1-bromo-2,3,4-tri-O-acetyl-D-glucopyranosyl uronate. The mixture was heated at 55°–65° C. for 3 hours in a nitrogen atmosphere.

The reaction mixture was cooled and poured into 450 ml. of ice-water and the resulting solid was collected by filtration, washed with water and dried. This product was dissolved in chloroform and chromatographed on silica gel using chloroform as an eluent. Two recrystallizations from benzene gave yellow fine needles of one mole benzene adduct of (2',3',4' - tri-O-acetyl-6'-O-methyl-D-glucuronosyl)-1-cinnamoyl-2-methyl - 5 - methoxy - 3 - indolylacetate. M.P. 150°–151° C.

*Analysis.*—Calcd. for $C_{40}H_{41}NO_3$ (percent): C, 64.18; H, 5.27; N, 1.83. Found (percent): C, 64.59; H, 5.56; N, 1.89.

Drying this compound at 90° C. under reduced pressure (30 mmHg) gave yellow fine needles of (2',3',4'-tri-O-acetyl-6'-O-methyl-D-glucuronosyl) - 1 - cinnamoyl-2-methyl-5-methoxy-3-indolylacetate. M.P. 150°–151° C.

EXAMPLE 2

A solution of 6.7 g. of methyl 2,3,4-tri-O-acetyl-D-glucopyranuronate, 4.9 g. of N,N'-dicyclohexylcarbodiimide and 2 ml. of pyridine in 20 ml. of dry tetrahydrofuran was added slowly to a solution of 7.0 g. of 1-cinnamoyl-2-methyl-5-methoxy-3-indolyl acetic acid in 150 ml. of dry tetrahydrofuran. The mixture was stirred at room temperature over night. Dicyclohexylurea which precipitated was filtered off and the solvent concentrated under reduced pressure to a solid residue, which was dissolved in 200 ml. of benzene. The benzene solution was washed three times with 200 ml. of water and concentrated under reduced pressure to a solid residue, which was dissolved in chloroform. The solution was chromatographed on silica gel and eluted with chloroform. Recrystallization from benzene followed by drying at 90° C. gave yellow fine needles of (2',3',4'-tri-O-acetyl-6'-O-methyl-D-glucuronosyl) - 1 - cinnamoyl-2-methyl-5-methoxy-3-indolyl acetate, M.P. 150°–151° C. The infrared absorption spectrum of the compound was identical with that of an authentic example obtained in Example 1.

$\lambda_{max.}^{Methanol}$ 292 m$\mu$ ($\epsilon$: 25,800), $\nu_{max.}^{Paraffin}$ 1760, 1745, 1670, 1580, 1250, 1220 cm.$^{-1}$.

*Analysis.*—Calcd. for $C_{34}H_{35}NO_3$ (percent): C, 61.35; H, 5.30; N, 2.10. Found (percent): C, 61.77; H, 5.07; N, 1.92.

EXAMPLE 3

A rabbit was dosed orally with 530 mg. of 1-cinnamoyl-2-methyl-5-methoxy-3-indolylacetic acid. Simultaneously, 1 g. of ammonium chloride was intraperitoneally administered to maintain the urine pH near 7. These compounds were administered in two equal doses at times 0 and 12 hours. Urines excreted during 24 hours after the first administration were collected, and the collected urine was adjusted to pH 5.0. Subsequently, the unconjugated metabolites were removed by extracting the urine with benzene (500 ml.). The residual urine was adjusted to pH 2.0 and then extracted with ethyl acetate. To the extract, 50 ml. of water was added, and ethyl acetate was evaporated in vacuo below 40° C. Thereafter, the residual water layer was adjusted to pH 6.6 and was then lyophilized to obtain 350 mg. of a brown granular material. Paper chromatography of this granular material in a system comprising 5 parts acetic acid and 95 parts isopropyl alcohol gave a single spot which was colored to deep purple by means of naphthoresorcinol, a color reagent for sugar. This spot was treated with β-glucuronidase to give 1-cinnamoyl-2-methyl-5-methoxy-3-indolyl acetic acid, which was identified according to ultraviolet absorption spectrum. This showed that the spot was due to glucuronosyl 1-cinnamoyl-2-methyl-5-methoxy-3-indolylacetate.

In order to obtain a purified glucuronide, the granular materials were applied onto a cellulose column (20 x 60 cm.). As the eluent was used a 4:2:2:2 mixed solvent of methanol, benzene, n-butanol and water, and the eluate was fractionated by a fraction collector. Each fraction was investigated according to paper chromatography. Thereafter, eluted fractions of glucuronosyl 1-cinnamoyl-2-methyl-5-methoxy-3-indolylacetate were combined and the mixed solvent was distilled off to obtain 60 mg. of a glucuronide.

The thus obtained glucuronide was enzymatically split by partially purified calf liver β-glucuronidase to liberate 1-cinnamoyl-2-methyl-5-methoxy-3-indolyl acetic acid, which is an aglycone, and was confirmed according to ultraviolet absorption spectrum.

EXAMPLE 4

To a suspension of 6.5 g. of 1-nicotinoyl-2-methyl-5-methoxy-3-indolylacetic acid in 100 ml. of water was added dropwise, 12 ml. of a 16.6% potassium bicarbonate solution at 50°±2° C. keeping the pH of the mixture below 7.5. After stirring at the same temperature for 1 hour, the reaction mixture was cooled and filtered.

The filtrate was concentrated to dryness under reduced pressure. The resultant residue was dissolved in 20 ml. of hot chloroform and there was added a few drops of water. The mixture was left in a refrigerator overnight. The deposited pale yellow crystals were collected by filtration to give potassium 1-nicotinoyl-2-methyl-5-methoxy-3-indolylacetate monohydrate, M.P. 60°–62° C.

*Analysis.*—Calcd. for $C_{18}H_{17}O_5N_2K$ (percent): C, 56.83; H, 4.50; N, 7.36. Found (percent): C, 56.53; H, 4.36; N, 7.14.

To a suspension of 3.1 g. of said potassium salt in 30 ml. of dimethylsulfoxide was added 3.4 g. of methyl 1-bromo-2,3,4-tri-O-acetyl-D-glucopyranosyl uronate at 50°–55° C. for 6 hours in a nitrogen atmosphere. The reaction mixture was cooled and poured into 300 ml. of ice-water and extracted with 200 ml. of benzene. The organic layer was washed twice with 200 ml. of water and concentrated to dryness under reduced pressure. The resulting residue was dissolved in chloroform and chromatographed on silica gel using chloroform as an eluent. Three recrystallizations from benzene gave pale green prisms of (2',3',4'-tri-O-acetyl-6'-O-methyl-D-glucuronosyl)-1-nicotinoyl-2-methyl - 5 - methoxy-3-indolylacetate, M.P. 169°–170° C.

$\lambda_{max.}^{MeOH}$ 265.2 ($\epsilon$=14,100), 319.5 ($\epsilon$=6,050) m$\mu$.

$\nu_{max.}^{Paraffin}$ 1770, 1760, 1675, 1610, 1590, 1210 cm.$^{-1}$.

*Analysis.*—Calcd. for $C_{31}H_{32}N_2O_{13}$ (percent): C, 58.12; H, 5.04; N, 4.37. Found (percent): C, 58.83; H, 4.83; N, 3.97.

EXAMPLE 5

A solution of 6.7 g. of methyl 2,3,4-tri-O-acetyl-D-glucopyranuronate, 4.9 g. of N,N'-dicyclohexylcarbodiimide and 2 ml. of pyridine in 20 ml. of dry tetrahydrofuran was added slowly to a solution of 6.5 g. of 1-nicotinoyl-2-methyl-5-methoxy-3-indolyl acetic acid in 180 ml. of dry tetrahydrofuran and the solution mixture was stirred at room temperature overnight. Dicyclohexylurea which precipitated was filtered off and the filtrate was concentrated under reduced pressure to a solid residue, which was dissolved in 200 ml. of benzene. The benzene solution was washed three times with 200 ml. of water and concentrated under reduced pressure to a solid residue which was dissolved in chloroform and chromatographed on silica gel and eluted with chloroform. Recrystallization from benzene gave pale green prisms of (2',3',4'-tri-O-acetyl-6'-O-methyl-D-glucuronosyl) - 1 - nicotinoyl-2-methyl-5-methoxy-3-indolylacetate, M.P. 169°–170°. An infrared absorption spectrum of the compound was identical with that of an authentic sample obtained in Example 4.

EXAMPLE 6

A rabbit was dosed orally with 500 mg. of 1-nicotinoyl-2-methyl-5-methoxy-3-indolylacetic acid. Simultaneously, 1 g. of ammonium chloride was intraperitoneally administered to maintain the urine at pH 7. These compounds were administered in two equal doses at times 0 and 12 hours. Urines excreted during 24 hours after the first administration were collected, and the collected urine was adjusted to pH 5.0. Subsequently, unconjugated metabolites were removed by extraction of the urine with benzene. The residual water layer was adjusted to pH 2.0 and then extracted with ethyl acetate. To the extract, 50 ml. of water was added, and ethyl acetate was evaporated in vacuo below 40° C. The residual water layer was adjusted to pH 6.6 and was lyophilized to obtain 300 mg. of a granular material. Paper chromatography of this granular material was conducted in a system comprising 5 parts acetic acid and 95 parts isopropyl alcohol, to form a spot which was colored to deep purple by means of naphthoresorcinol, a color reagent for sugar, or which showed an absorption in the ultraviolet absorption spectrum. This spot was cut off and was treated with β-glucuronidase to obtain 1-nicotinoyl-2-methyl-5-methoxy-3-indolylacetic acid, which was confirmed according to ultraviolet absorption spectrum.

In order to obtain a purified glucuronide, the granular material was applied onto a cellulose column (2.0 x 60 cm.). The granular material was eluted with a 4:2:2:2 mixed solvent of methanol, benzene, n-butanol and water, and the eluate was fractionated by a fraction collector. Each fraction was investigated according to paper chromatography. Thereafter, eluted fractions of glucuronosyl 1-nicotinoyl-2-methyl-5-methoxy - 3 - indolylacetate were combined and the mixed solvent was evaporated in vacuo to give 54 mg. of a desired product.

The thus obtained glucuronide was enzymatically split by partially purified calf liver β-glucuronidase to liberate 1-nicotinoyl-2-methyl - 5 - methoxy-3-indolylacetic acid which is an aglycone. According to paper chromatography, the Rf value of the product corresponded with that of a standard product, and the ultraviolet absorption spectrum $\lambda_{max}$ of the product was 265 mμ.

What we claim is:

1. A glucuronide of a 3-indolylaliphatic acid derivative represented by the formula

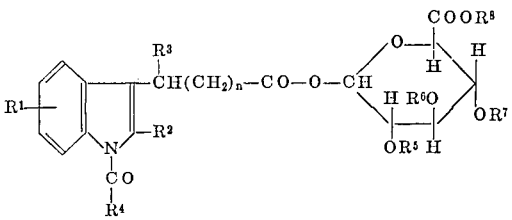

wherein $R^1$ is hydrogen, lower alkyl, lower alkoxy, lower alkylthio or halogen, $R^2$ and $R^3$ are individually hydrogen, phenyl or lower alkyl, $R^4$ is pyridyl or styryl, $R^5$, $R^6$ and $R^7$ are individually hydrogen or acetyl, $R^8$ is hydrogen or lower alkyl, and $n$ is 0, 1 or 2.

2. 2′,3′,4′-tri-O-acetyl - 6′ - O - methyl- D-glucuronosyl 1-cinnamoyl-2-methyl-5-methoxy-3-indolylacetate.

3. Glucuronosyl 1-cinnamoyl - 2 - methyl-5-methoxy-3-indolylacetate.

4. 2′,3′,4′-tri-O-acetyl - 6′ - O - methyl-D-glucuronosyl 1-nicotinoyl-2-methyl-5-methoxy-3-indolylacetate.

5. Glucuronosyl 1 - nicotinoyl - 2 - methyl-5-methoxy-3-indolylacetate.

6. A pharmaceutical composition comprising, as the essential ingredient, an effective amount of a glucuronide of 3-indolylaliphatic acid derivative as defined in claim 1 and a pharmaceutically acceptable carrier.

References Cited
UNITED STATES PATENTS 3,316,260    4/1967    Shen _____ 260—209
3,242,163    3/1966    Sarett et al. _____ 260—211

ELBERT L. ROBERTS, Primary Examiner
J. R. BROWN, Assistant Examiner

U.S. Cl. X.R.

260—209 R, 210 R, 211 R, 326.13; 414—180, 266

UNITED STATES PATENT OFFICE
CERTIFICATE OF CORRECTION

Patent No. 3,629,238      Dated December 21, 1971

Inventor(s) Arasaki et al.

It is certified that error appears in the above-identified patent and that said Letters Patent are hereby corrected as shown below:

Insert the following claim for priority:

-- Japanese No. 62928/67 of September 29, 1967
   Japanese No. 62929/67 of September 29, 1967 --

Signed and sealed this 8th day of August 1972.

(SEAL)
Attest:

EDWARD M. FLETCHER, JR.      ROBERT GOTTSCHALK
Attesting Officer                Commissioner of Patents